(12) United States Patent
Hikichi

(10) Patent No.: US 10,275,191 B2
(45) Date of Patent: Apr. 30, 2019

(54) INFORMATION PROCESSING APPARATUS INCLUDING NONVOLATILE STORAGE DEVICE, AND CONTROL METHOD FOR SAME

(71) Applicant: CANON KABUSHIKI KAISHA, Tokyo (JP)

(72) Inventor: Atsushi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/873,408

(22) Filed: Jan. 17, 2018

(65) Prior Publication Data
US 2018/0210679 A1     Jul. 26, 2018

(30) Foreign Application Priority Data
Jan. 24, 2017 (JP) ................. 2017-010752

(51) Int. Cl.
*G06K 15/00* (2006.01)
*G06F 3/12* (2006.01)
*H04N 1/00* (2006.01)

(52) U.S. Cl.
CPC ............ *G06F 3/122* (2013.01); *G06F 3/1279* (2013.01); *H04N 1/00896* (2013.01); *H04N 2201/0094* (2013.01)

(58) Field of Classification Search
CPC ... G06F 3/122; G06F 3/1279; H04N 1/00896; H04N 2201/0094

USPC ....................................................... 358/1.15
See application file for complete search history.

(56) References Cited

U.S. PATENT DOCUMENTS

| | | | | |
|---|---|---|---|---|
| 2012/0151127 | A1* | 6/2012 | Lim | G06F 12/0246 711/103 |
| 2014/0176975 | A1* | 6/2014 | Kobayashi | G03G 15/5004 358/1.13 |
| 2015/0124277 | A1* | 5/2015 | Ono | G06F 3/1222 358/1.14 |
| 2016/0034350 | A1* | 2/2016 | DeBrosse | G11C 11/4076 714/764 |

FOREIGN PATENT DOCUMENTS

JP       02-129725 A       5/1990

\* cited by examiner

*Primary Examiner* — Neil R McLean
(74) *Attorney, Agent, or Firm* — Canon U.S.A., Inc. IP Division

(57) ABSTRACT

An information processing apparatus includes a nonvolatile storage unit including an auxiliary storage area defined therein to save data from a real storage area, and a control unit configured to reduce a tendency for saving data from the real storage area to the auxiliary storage area from a tendency in a first power state based on a transition of the information processing apparatus from the first power state to a second power state with lower power consumption than power consumption in the first power state.

6 Claims, 6 Drawing Sheets

INFORMATION PROCESSING APPARATUS INCLUDING NONVOLATILE STORAGE DEVICE, AND CONTROL METHOD FOR SAME

BACKGROUND

Field of the Disclosure

The present disclosure relates to an information processing apparatus in which a nonvolatile storage unit or the like can be mounted.

Description of the Related Art

Modes of an information processing apparatus including a nonvolatile storage medium include a mode in which the information processing apparatus is waiting in a state where data can be transmitted or received via a network (network waiting mode) and a mode in which the information processing apparatus is waiting in a power saving state (power saving waiting mode). In these modes, a nonvolatile storage device may be frequently accessed from an application in the apparatus, or from a server of the network.

For example, consider a case where access to a hard disk drive (HDD) (nonvolatile storage device) in association with a swap, polling access from an application, or the like is frequently made. In a case where an application accesses a memory at regular intervals, an operating system (OS) irregularly causes a swap to increase an available memory. This results in an increase in an HDD access frequency. As a result, the access to the HDD may have an adverse effect on an operation of the HDD.

For example, consider a case where write access to a solid-state drive (SSD) (nonvolatile storage device) in association with a swap, polling access from an application, or the like, is frequently made. There is an upper limit to the number of times of writing data in the SSD based on a writing volume or the like. When the number of times of writing data approaches the upper limit, the access to the SSD may have an adverse effect on an operation of the SSD.

Japanese Patent Application Laid-Open No. 02-129725 discusses a technique in which a system call for prohibiting swap-out is issued to an OS to prevent a program loaded into a main storage from being swapped out during execution of the program. The OS that has received the system call performs swap-out prohibition registration of the storage area.

In the prior art described above, it has been difficult to mitigate the effects on the performance and physical functions of the nonvolatile storage device based on frequent access to the nonvolatile storage device.

SUMMARY

According to an aspect of the present disclosure, an information processing apparatus includes a nonvolatile storage unit including an auxiliary storage area defined therein to save data from a real storage area, and a control unit configured to reduce a tendency for saving data from the real storage area to the auxiliary storage area from a tendency in a first power state based on a transition of the information processing apparatus from the first power state to a second power state with lower power consumption than power consumption in the first power state.

According to another aspect of the present disclosure, an information processing apparatus includes a human presence sensor unit, a nonvolatile storage unit including an auxiliary storage area defined therein, and a control unit configured to increase or reduce a tendency for saving data from a real storage area to the auxiliary storage area based on a detection result of the human presence sensor unit.

Further features of the present disclosure will become apparent from the following description of exemplary embodiments with reference to the attached drawings.

DESCRIPTION OF THE EMBODIMENTS

Exemplary embodiments for carrying out the present disclosure will be described below with reference to the drawings.

<Configuration of System>

Figure 1:
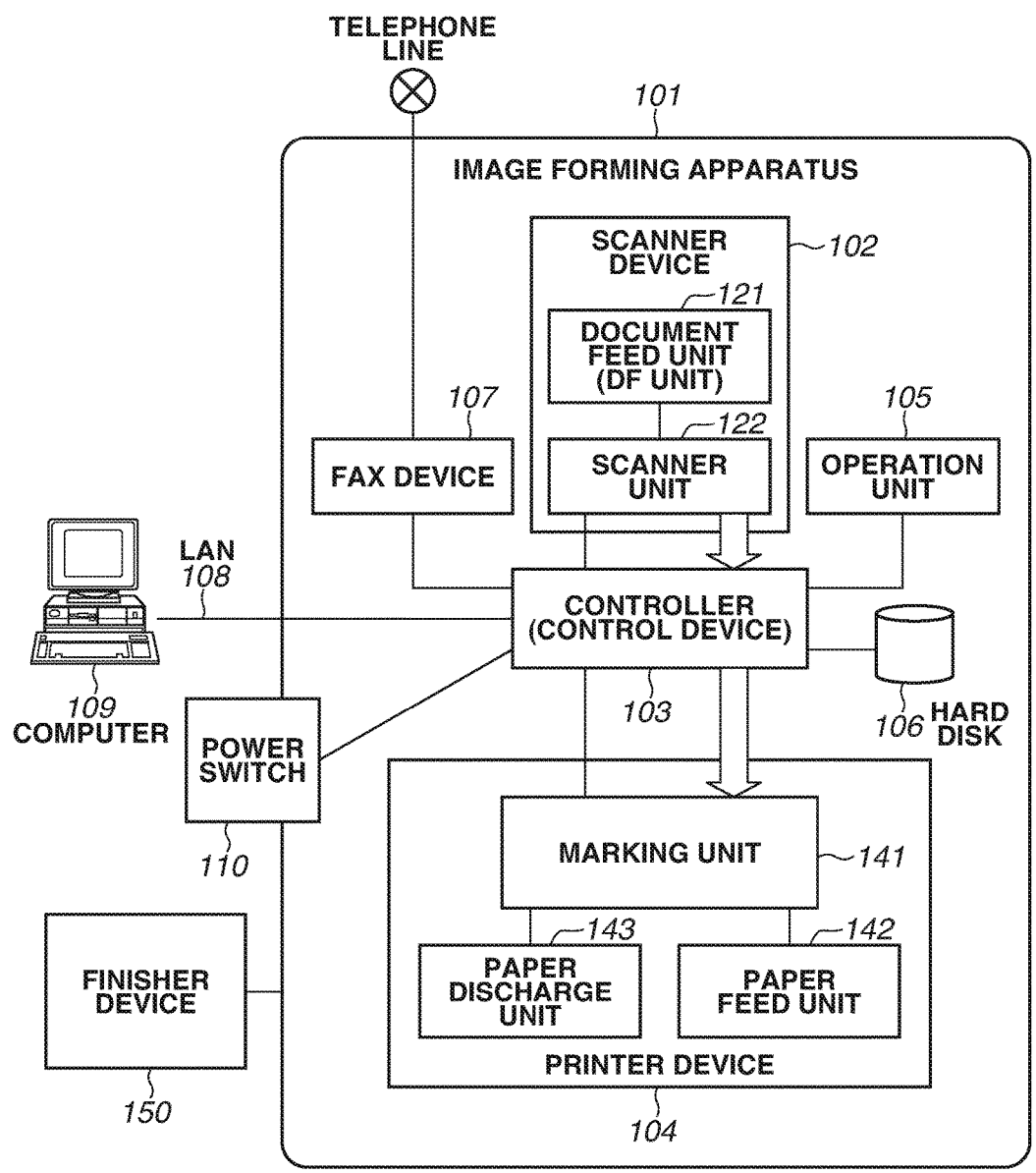
FIG. 1 is a diagram illustrating an example of an overall view of an image forming apparatus according to an exemplary embodiment of the present disclosure.

FIG. 1 is a block diagram illustrating a configuration of an image forming apparatus according to the present exemplary embodiment. The present exemplary embodiment illustrates an example of a multifunction peripheral including a print function, a scanner function, and a data communication function. An image forming apparatus 101 is an example of an information processing apparatus.

Referring to FIG. 1, the image forming apparatus 101 is configured to be able to receive a job from a computer 109 via a local area network (LAN) 108. One or more computers can be connected. A scanner device 102 optically reads an image from a document and converts the image into a digital image. A printer device 104 outputs the digital image to a paper device which is referred to as a sheet. An operation unit 105 includes a touch panel and/or hardware keys for receiving a setting for the apparatus from a user, or displaying a processing status. A hard disk (also referred to as a hard disk drive (HDD)) 106 stores the digital image, a control program, and the like.

A FAX device 107 transmits and receives the digital image to and from a telephone line or the like. A controller 103 is connected to each of the scanner device 102, the printer device 104, the operation unit 105, the hard disk 106, and the FAX device 107, and issues instructions to each module to execute a job on the image forming apparatus 101.

The image forming apparatus 101 can also input and output the digital image to and from the computer 109 via the LAN 108, issue a job, and designate a device. The scanner device 102 includes a document feed unit 121 capable of replacing a document bundle automatically and sequentially, and a scanner unit 122 capable of optically scanning a document and converting the document into a digital image. Image data obtained by the conversion is transmitted to the controller 103.

The printer device 104 includes a paper feed unit 142 capable of sequentially feeding paper sheets from a sheet bundle one by one, a marking unit 141 for printing image data on the fed paper sheets, and a paper discharge unit 143 for discharging the paper sheets on which the image data has been printed. A finisher device 150 performs processing, such as discharge, sorting, stapling, punching, and cutting, on the sheet device output from the paper discharge unit 143 in the printer device 104 of the image forming apparatus 101.

A power switch 110 that is connected to the controller 103 is held. When the power switch 110 is turned on, power is supplied to at least a power control unit 303, which is described below, the operation unit 105, and a part of a main board of the controller 103. Even when the power switch 110 is turned off, the power supply does not immediately stops, but instead the supply of power to parts other than the part necessary for turning on the power switch 110, such as a part of the power control unit 303, stops after waiting for a termination process for software or hardware.

<Functions of System>

An example of jobs (functions) that can be executed by the image forming apparatus 101 will be described below.

[Copying Function]

The image forming apparatus 101 includes a copying function for recording an image read from the scanner device 102 on the hard disk 106, and simultaneously printing the image using the printer device 104.

[Image Transmission Function]

The image forming apparatus 101 includes an image transmission function for transmitting an image read from the scanner device 102 to the computer 109 via the LAN 108.

[Image Storage Function]

The image forming apparatus 101 includes an image storage function for recording an image read from the scanner device 102 on the hard disk 106 or a flash disk 207, which is described below, and performing, as needed, image transmission or image printing.

[Image Printing Function]

The image forming apparatus 101 includes an image printing function for analyzing, for example, a page description language transmitted from the computer 109, and printing the page description language using the printer device 104.

<Configuration of Operation Unit 105>

The operation unit 105 is connected to the controller 103 and includes a liquid crystal display (LCD) touch panel, a power saving button, a copy button, a cancel button, a reset button, a numeric keypad, and a user mode key. The operation unit 105 provides a user interface (I/F) for operating an image input/output system. It can be assumed that a human presence sensor for detecting a human or the like approaching the human presence sensor by an infrared ray or the like is provided as a unit that is formed integrally with or separately from the operation unit 105.

<Block Diagram of Controller 103>

Figure 2:
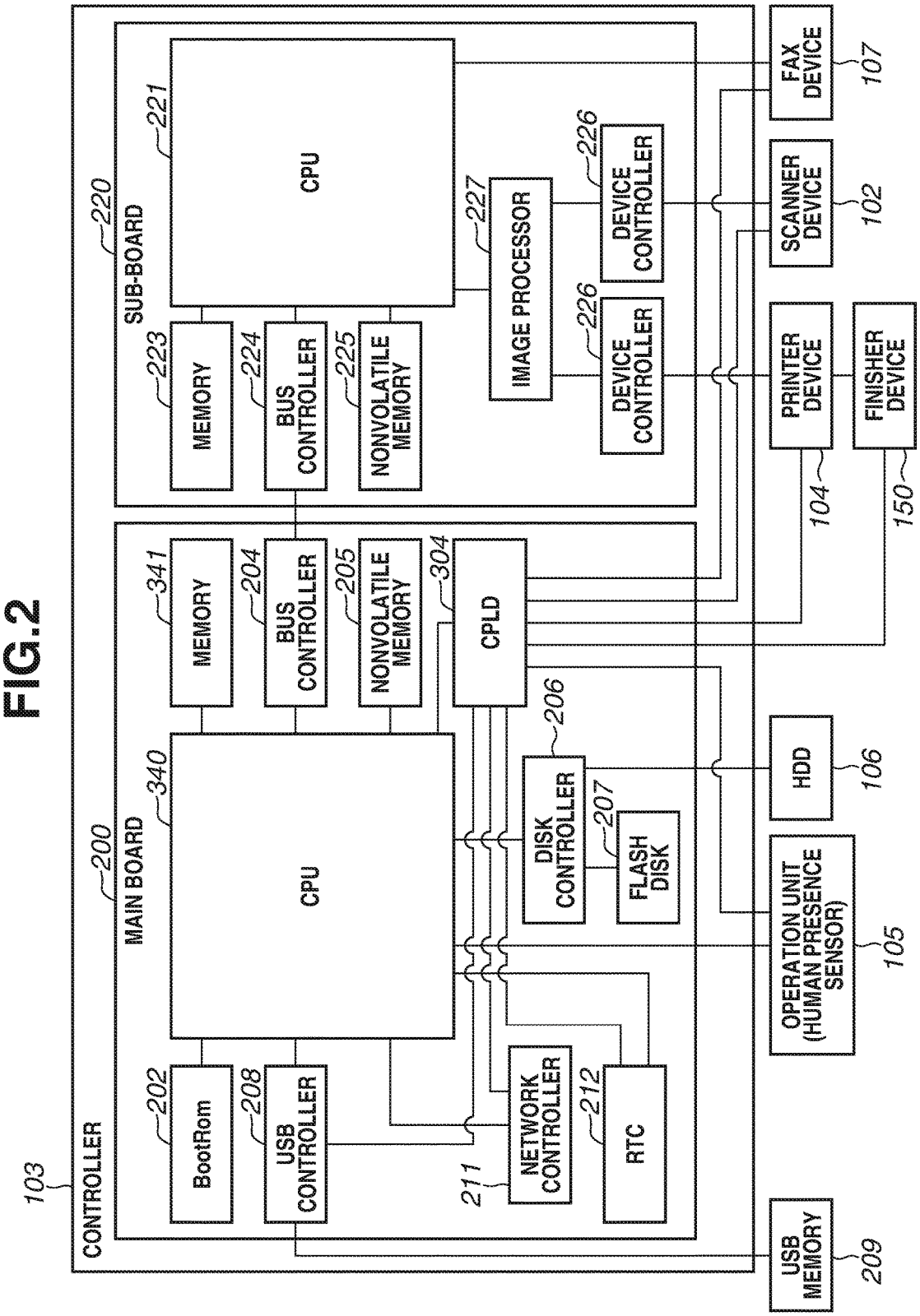
FIG. 2 is a diagram illustrating an example of a block diagram of a controller according to an exemplary embodiment of the present disclosure.

A block diagram illustrating the controller 103 and peripheral devices will be described with reference with FIG. 2.

The controller 103 includes a main board 200 and a sub-board 220.

The main board 200 is a general-purpose central processing unit (CPU) system. The main board 200 includes a CPU 340 that controls the entire board, a boot read-only memory (ROM) 202 storing a boot program, a memory 341 used as a work memory by the CPU 340, a bus controller 204 including a bridge function with an external bus, and a nonvolatile memory 205 that maintains stored data even when the power thereto is turned off. The controller 103 also includes a disk controller 206 that controls a storage device, a flash disk 207 including a semiconductor device, and a universal serial bus (USB) controller 208 capable of controlling a USB. Examples of the flash disk 207 serving as a storage device having a relatively small capacity include a solid-state drive (SSD).

A USB memory 209, the operation unit 105, the hard disk 106, and the like are externally connected to the main board 200.

The CPU 340 is connected to a Complex Programmable Logic Device (CPLD) 304 that controls an interrupt from each device or power supply to each device. The CPU 340 is also connected to each of a network controller 211, a real-time clock (RTC) 212, the FAX device 107, and the USB controller 208. The CPU 340 is further connected to each of the operation unit 105 including a soft switch, the scanner device 102 including various sensors, the printer device 104, the finisher device 150, and the like, which are devices provided outside of the controller.

The sub-board 220 includes a relatively small general-purpose CPU system and image processing hardware. The sub-board 220 includes a CPU 221 that controls the entire board, a memory 223 used as a work memory by the CPU 221, a bus controller 224 including a bridge function with an external bus, and a nonvolatile memory 225 that maintains stored data even when the power thereto is turned off.

The sub-board 220 also includes an image processor 227 that performs real-time digital image processing, and device controllers 226.

The scanner device 102 and the printer device 104, which are externally connected to the controller 103, transfer digital image data via the device controllers 226. A paper device discharged from the printer device 104 is processed by the finisher device 150. The FAX device 107 is directly controlled by the CPU 221. FIG. 2 is a simplified block diagram. For example, the CPU 340, the CPU 221, and the like include a large number of pieces of CPU peripheral hardware, such as a chip set, a bus bridge, and a clock generator.

An image copying operation on a paper device will be described as an exemplary operation of the controller 103.

When a user instructs the operation unit 105 to perform the image copying operation, the CPU 340 sends an image read command to the scanner device 102 via the CPU 221. The scanner device 102 optically scans an image on a paper document, converts the scanned image into digital image data, and inputs the digital image data to the image processor 227 via one of the device controllers 226. The image processor 227 performs Direct Memory Access (DMA) transfer to the memory 223 via the CPU 221, and temporarily stores the digital image data.

The CPU 340 issues an image output instruction to the printer device 104 via the CPU 221 when it is confirmed that a predetermined amount or all of the digital image data has entered the memory 223.

The CPU 221 notifies the image processor 227 of an address of the image data on the memory 223. The image data on the memory 223 is transmitted to the printer device 104 via the image processor 227 and one of the device controllers 226 according to a synchronization signal from the printer device 104.

The printer device 104 prints the digital image data on the sheet device.

When a plurality of copies of sheets is to be printed, the CPU 340 stores, in the hard disk 106, the image data on the memory 223. The CPU 340 can send the image from the hard disk 106 and the memory 223 to the printer device 104 without receiving the image from the scanner device 102 for the second and subsequent print copies. The same configuration can be applied also when a single copy of a sheet is to be printed.

<Power Supply Configuration>

Figure 3:
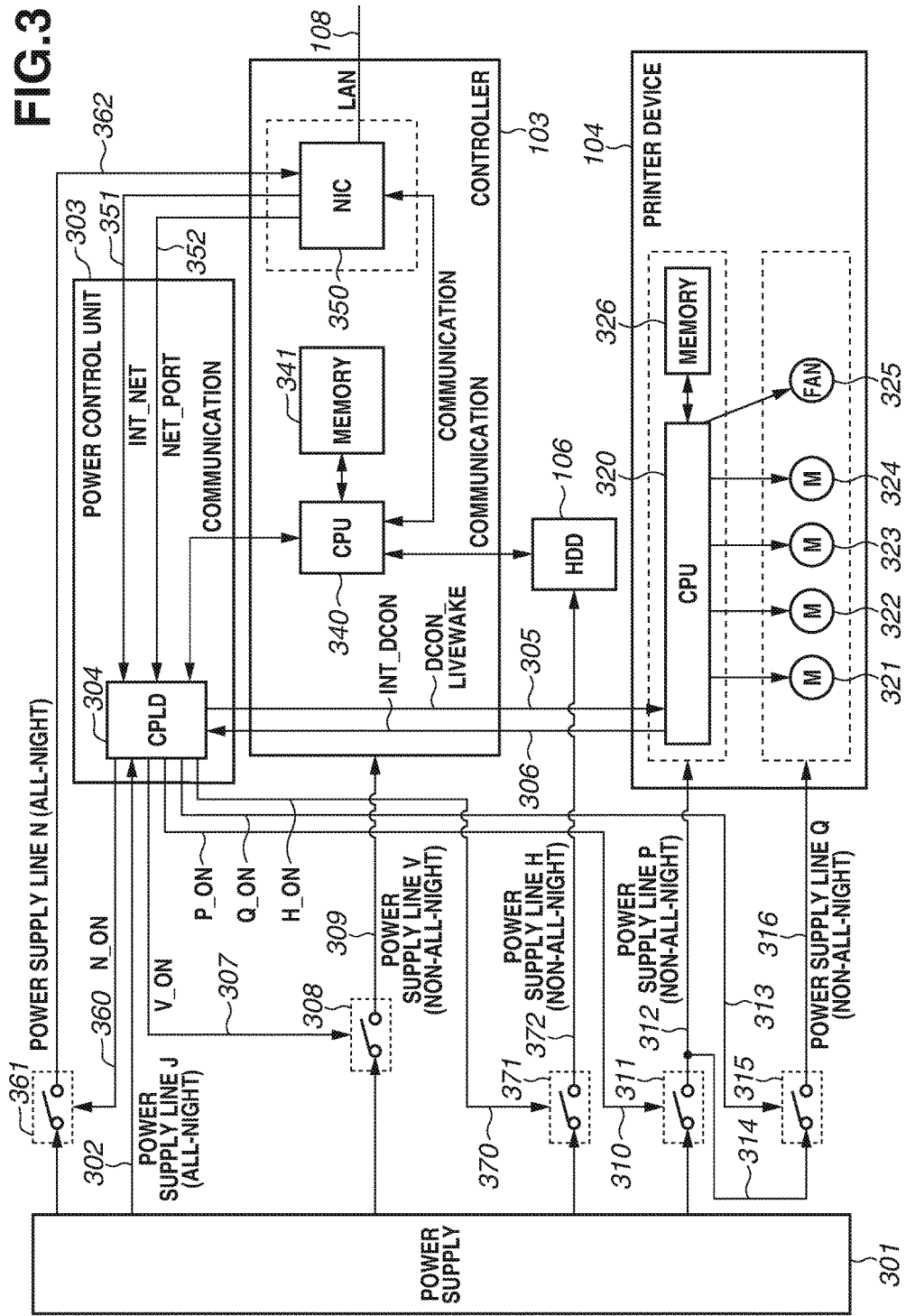
FIG. 3 is an example illustrating a power supply configuration diagram of the image forming apparatus according to an exemplary embodiment of the present disclosure.

FIG. 3 is a block diagram illustrating a power supply configuration of the image forming apparatus 101 illustrated in FIG. 1. Parts associated with the present disclosure in the configurations of the controller 103 and the printer device 104, the power control unit 303, and a power supply 301 in the image forming apparatus 101 will be described below with reference to FIG. 3. Referring to FIG. 3, power is always supplied to the power control unit 303 via a power supply line J 302 which is a first power supply line. However, since the power consumption remains low, power control is performed such that only the power control unit 303 is energized during power-off.

The CPLD 304 is programmed in advance to execute a desired operation as described below. That is, an IO signal V_ON 307, which is a first power control signal, controls the supply of power to the controller 103 that is supplied from the power supply 301 via a power supply line V 309, which is a second power supply line, by switching a relay switch 308. The CPU 340 sets a plurality of timer values by communication, and executes an operation set by the CPU 340 at a start of a timer.

An IO signal P_ON 310, which is a second power control signal, switches a relay switch 311. As a result, the supply of power to a logic system circuit of the printer device 104 that is supplied from the power supply 301 via a power supply line P 312, which is a third power supply line, is controlled.

Further, an IO signal Q_ON 313, which is a sub-signal of the second power control signal, switches a relay switch 315. As a result, the supply of power to a load system device of the printer device 104 that is supplied from the power supply 301 via a power supply line Q 316, which is a sub-line of the third power supply line, is controlled. The above-described power supply line Q 316 need not necessarily be a sub-line of the power supply line P 312. The power can be supplied from the power supply 301, but the description thereof is omitted because it is not directly related to the description of the present exemplary embodiment. The relay switch 315 is controlled from the CPLD 304, and can also be controlled from the CPU 320 or the like, but the description thereof is omitted because it is not directly related to the description of the present exemplary embodiment.

A predetermined IO signal is operated according to an instruction from the CPU 320. One of the IO signals to be operated is a DCON_LIVEWAKE signal 305 that is connected to the CPU 320 of the printer device 104. When the printer device 104 is powered on in a state where the signal is asserted, the printer device 104 resumes quietly without performing any specific operation by controlling a movable part or using power. Examples of the specific operation include a rotational operation of a motor, a roller, a polygon, or the like, temperature control of drums (321, 322, 323, and 324), and an exhaust heat process by a FAN 325. Like the printer device 104, the scanner device 102 can be controlled from the CPLD 304, but repeated description thereof is omitted. That is, a power supply control similar to that for the printer device 104 is performed on the scanner device 102.

The power supply for each block illustrated in FIG. 3 can be implemented in such a manner that, for example, the relay switch 308 is composed of two systems, and only the relay switch leading to a block for turning off the power supply is turned off and the other relay switch is maintained in an ON-state in a sleep state. In a shutdown state, the relay switches of the both systems are turned off. In this case, the power control signal is not a binary signal, but instead a multi-valued control signal according to an energization state. In this example, the detailed description thereof is omitted, but in each power state including the sleep state or the shutdown state, the power supply is performed based on the control as described above.

Specifically, the CPLD 304 switches a relay switch 361 by using an IO signal N_ON 360 which is a third power control signal, and the power supply to a Network Interface Card (NIC) 350 is controlled via a power supply line N 362, which is the third power supply line, from the power supply 301. In the controller 103, only the NIC 350 is supplied with power. Unlike other non-all-night power supplies, the power supply line N 362 is supplied with power not only in a normal mode but also in a sleep mode, thereby enabling network wakeup. At the time of shutdown, power is not supplied unless a setting of Wake On LAN and the like is effective. The power source line N 362 via the relay switch 361 is in a state where power is supplied at all times in a state other than the off state. To avoid the redundancy, the power supply line N 362 via the relay switch 361 is not explicitly described below.

Further, an IO signal H_ON 370 which is a fourth power control signal switches a relay switch 371 to control the power supply to the HDD 106 that is supplied from the power supply 301 via a power supply line H 372 which is a fourth power supply line. As illustrated in the block diagram described above, data is exchanged among the CPU 340, the HDD 106, and the flash disk 207 via the disk controller 206. The flash disk 207 can be replaced by the HDD 106, and power can be supplied to the flash disk 207 and the HDD 106 at the same time. The HDD 106 and the flash disk 207 are examples of a nonvolatile storage device.

<Power Supply Monitoring 1 of Power Control Unit 303: Power Supply During Activation>

A process for activating the image forming apparatus 101 will be described. When an operator uses the image forming apparatus 101, the power switch 110 is turned on. Then, the power control unit 303 detects power-on by the power supply line J 302, and the relay switches 308 and 311 are turned on by the power switch control signals 307 and 310, respectively, so that the power supply 301 supplies power to the entire apparatus. The power control unit 303 supplies power to the entire system in response to power-on, specifically, energizes the controller 103, the printer device 104, and the scanner device 102 through respective DC power supply paths. The printer device 104 and the scanner device 102 start an initialization operation when each CPU is powered on.

When the energization is performed, the CPU 340 of the controller 103 performs hardware initialization. Examples of the hardware initialization include register initialization, interrupt initialization, registration of a device driver during Kernel activation, and initialization of the operation unit 105. Then, the CPU 340 of the controller 103 performs software initialization. Examples of the software initialization include calling an initialization routine in each library, activation of a process or a thread, activation of a software service for performing communication with the printer device 104 and the scanner device 102, and rendering of the operation unit 105. Lastly, the CPU 340 transits to a standby state. The standby state is used for the same meaning as the normal state.

<Power Supply Monitoring 2 of Power Control Unit 303: Power Supply During Normal State>

The power supply in the normal state of the image forming apparatus 101 in which the printer device 104 and the scanner device 102 are not used will be described. The normal state indicates not only a state in which power is supplied to all units, but also a state where power is not supplied to the printer device 104 when printing is not performed, a state where power is not supplied to the scanner device 102 when the operation unit 105 is not turned on and it is apparent that the user is not present in front of the image forming apparatus 101, or the like.

Further, power is supplied to accelerate completion of printing of the printer device 104, or completion of reading of the scanner device 102. However, there is an operation waiting state such as a state where a motor or a polygon for printing is not operated, a state where temperature control for a transfer unit for printing is not performed, or a state where home position detection for reading is not activated.

<Power Supply Monitoring 3 of Power Control Unit 303: Power Supply During Page Description Language (PDL) Printing>

The power supply of the image forming apparatus 101 in a state where the printer device 104 and the scanner device 102 are used in a PDL printing state will be described. Power ON or OFF of the printer device 104 will be described using the image printing function.

The CPU 340 of the controller 103 receives, in the memory 341, data from the computer 109 via the LAN 108. When the CPU 340 analyzes the received data and executes the image printing function, the CPU 340 generates a print job.

The CPU 340 notifies the CPLD 304 of the print job, switches the relay switch 311 by the power control signal 310, and supplies power from the power supply 301 to the printer device 104 via the power supply line P 312. The CPU 340 executes the print job when the printer device 104 is available. The CPU 340 transmits data to each of the memory 341, the bus controller 204, the bus controller 224 for the sub-board 220, and the CPU 221 of the sub-board 220. The data is further transmitted to the printer device 104 via the image processor 224 and the device controller 226. When the printer device 104 prints the received data and completes printing, the printer device 104 notifies the CPU 340 of the printing result. After completion of printing, the CPU 340 turns off the relay switch 311 by the power control signal 310 via the power control unit 303, and turns off the power supply of the printer device 104.

<Power Supply Monitoring 4 of Power Control Unit 303: Power Supply During Transition to Sleep>

A sleep transition process of the controller 103 will be described. When the standby state (normal state) in which the user does not use the image forming apparatus 101 is held for a certain period of time, the CPU 340 performs control to transit to the sleep state. The CPU 340 notifies the power control unit 303 of the transition to the sleep state, and changes the power supply to the controller 103. As described above, the power supply for each block can be implemented in such a manner that, for example, the relay switch 308 is composed of two systems, and only the relay switch leading to a block for turning off the power supply is turned off and the other relay switch is maintained in the ON-state in the sleep state.

<Power Supply Monitoring 5 of Power Control Unit 303: Power Supply During Sleep>

The sleep state of the image forming apparatus 101 will be described. The sleep state indicates a state where an activation time can be set to be shorter than a normal activation time, while suppressing the amount of power consumption. The image forming apparatus 101 transits to the sleep state, for example, when a certain period of time has elapsed in a state where the user does not use the image forming apparatus 101, when a power saving key on the operation unit 105 is pressed, or when a set time has come.

An example of the sleep state as described below is considered. Power is supplied to the CPU 340, the memory 341 of the controller 103, an interrupt controller, the network controller 211, the RTC 212, the USB controller 208, and the like. The CPU 340 and the memory 341 which are provided in the controller 103 are energized. Accordingly, a swap to the flash disk drive 207 and/or the HDD 106 from the memory 341 or the like may occur. The flash disk drive 207 and the HDD 106 illustrated in FIG. 2 may be energized. In this case, however, power may be supplied to the power saving key on the operation unit 105, a part of the FAX device 107, various sensors, and the like. Since a sleep return factor varies depending on the system, the power supply in the sleep state is not limited to this configuration. Then, the energization to units other than the units described above stops. For example, the energization to the device controllers 226 and various devices 104, 102, 107, and 150 stops. The energization to a principal part of a user interface (UI) control unit, especially, a backlight, basically stops. However, the human presence sensor is energized. The normal state and the standby state are examples of a first power state. The sleep state is an example of a second power state.

Another example of the sleep state is described below. In the sleep state, power is supplied to the CPU 340, the memory 341 of the controller 103, the interrupt controller, the network controller 211, the RTC 212, the USB controller 208, and the like. Other function modules including the flash disk drive 207 and the HDD 106 illustrated in FIG. 2 are not basically energized in the sleep state. However, the CPU 340 and the memory 341 of the controller 103 are energized. A link connecting the HDD 106 to the CPU 340 and a link connecting the flash disk drive 207 to the CPU 340 are not disconnected. Accordingly, a swap to the flash disk drive 207 and/or the HDD 106 from the memory 341 or the like may occur. Specifically, assume that the CPU 340 determines that a swap to the HDD 106 and/or the flash disk drive 207 is required. Then, a spin-up instruction is issued by the CPU 340 to the HDD 106 and/or the flash disk drive 207 via the disk controller 206, so that the above-described swap may occur.

Power may be supplied to the power saving key on the operation unit 105, a part of the FAX device 107, various sensors, and the like. The energization to, for example, the principal part of the UI control unit, especially, the backlight, can stop. However, the human presence sensor is energized. Since the sleep return factor varies depending on the system, the power supply in the sleep state is not limited to this configuration. The energization to units other than the above-described units stops. For example, the energization to the device controllers 226 and various devices 104, 102, 107, and 150 also basically stops. The normal state and the standby state are examples of the first power state. The sleep state is an example of the second power state.

An operation of the system at the time of returning from sleep will be described. During sleep, the CPLD 304 receives one or more interrupts, such as a network, an RTC for detecting a timer or an alarm, a FAX for detecting an incoming call or off-hook, a soft switch, various sensors, and a USB for detecting insertion/removal or communication, and starts the power supply. The CPLD 304 transmits to the CPU 340 a notification regarding an interrupt cause. The CPU 340 receives the notification and performs a process for returning the operation state of software to the normal state, i.e., a sleep return process.

During the sleep state in which the CPU 340 is operating, the following operation can be performed. For example, there is a state where the user does not explicitly use the image forming apparatus 101 (e.g., when the backlight is turned off). In this case, a swap to the HDD 106 can stops wherever possible.

As a power saving state, the following state can be considered. The CPU 340, the memory 341, and the HDD 106 are energized. The UI control unit does not energize the backlight, and energizes the other units such as the UI control unit. The printer controller and the scanner controller are not energized. As the power saving state, another state as described below can be considered. The CPU 340 and the memory 341 are energized. The UI control unit does not energize the backlight, and energizes the other units such as a control unit of a UI. Further, the printer controller and the scanner controller are not energized. A drive of the HDD 106 is not energized, while the link connecting the HDD 106 to the CPU 340 is maintained. For example, a Serial AT Attachment (SATA) PHY interface is energized to be linked to the CPU 340.

<Power Supply Monitoring 6 of Power Control Unit 303: Power Supply During Sleep Return>

The sleep return process of the controller 103 will be described. During sleep, when an event to press the power saving key, which is a sleep return factor, is received, the power control unit 303 receives the sleep return factor and the CPU 340 returns from sleep. The CPU 340 notifies the power control unit 303 of the return from sleep. After that, the power control unit 303 turns on the relay switches 308 and 311 by the power control signals 307 and 310, respectively. As a result, power is supplied to the controller 103, the printer device 104, and the scanner device 102. Although the power control signal for the scanner device 102 is not illustrated in FIG. 3, the power control signal can be shared with the printer device 104, or can be prepared as a signal which is not illustrated.

After a lapse of a predetermined time after the print job is completed, the CPU 340 transits to the sleep state again. The CPU 340 notifies the power control unit 303 of the transition to sleep, and the power control unit 303 turns off the relay switch 311 by the power control signal 310 to stop the power supply to units other than the controller 103.

Similarly, a case where a network reception event, which is a sleep return factor, is generated during sleep is considered. The power control unit 303 receives the sleep return factor and turns on the relay switch 308 by the power control signal 307 to supply power to the controller 103. Thus, the CPU 340 returns from sleep. If no job is generated, or if it is unnecessary to acquire device information, the printer device 104 and the scanner device 102 need not supply power. In a case where the human presence sensor detects a human or the like, the CPU 340 can return from the sleep state to the normal state.

Figure 5:
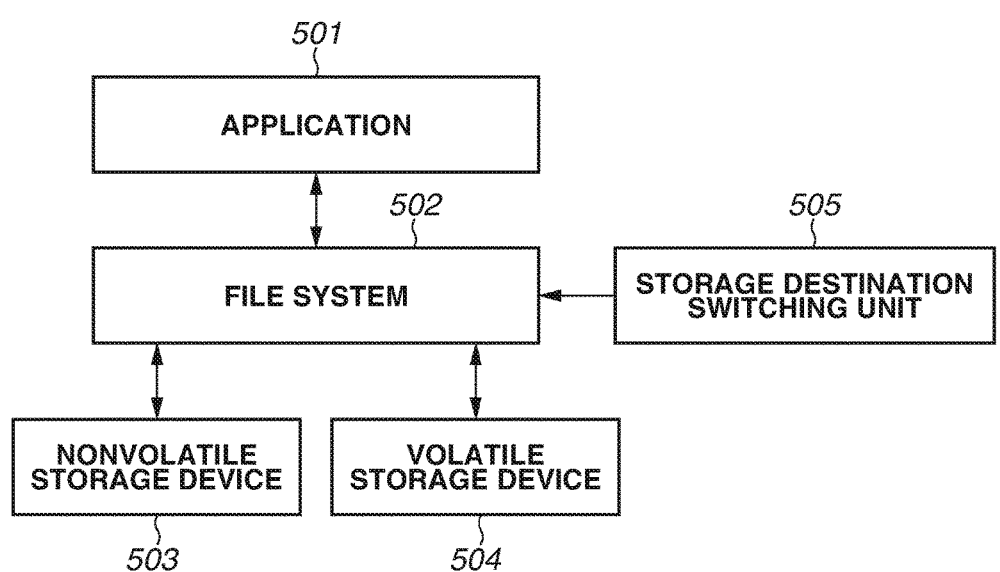
FIG. 5 is a diagram illustrating a system configuration example in the image forming apparatus according to an exemplary embodiment of the present disclosure.

FIG. 5 is a diagram illustrating an example of a system configuration according to the present exemplary embodiment.

FIG. 5 will be described. The CPU 340 executes an application 501. The application 501 accesses a nonvolatile storage device 503 via a file system 502. The file system 502 performs a read and write operation on the nonvolatile storage device 503 and/or a volatile storage device 504. The nonvolatile storage device 503 corresponds to each of the flash disk drive 207, the HDD 106, and the nonvolatile memory 205 which are illustrated in FIG. 2. The volatile storage device 504 corresponds to the memory 341 illustrated in FIG. 2.

Figure 4:
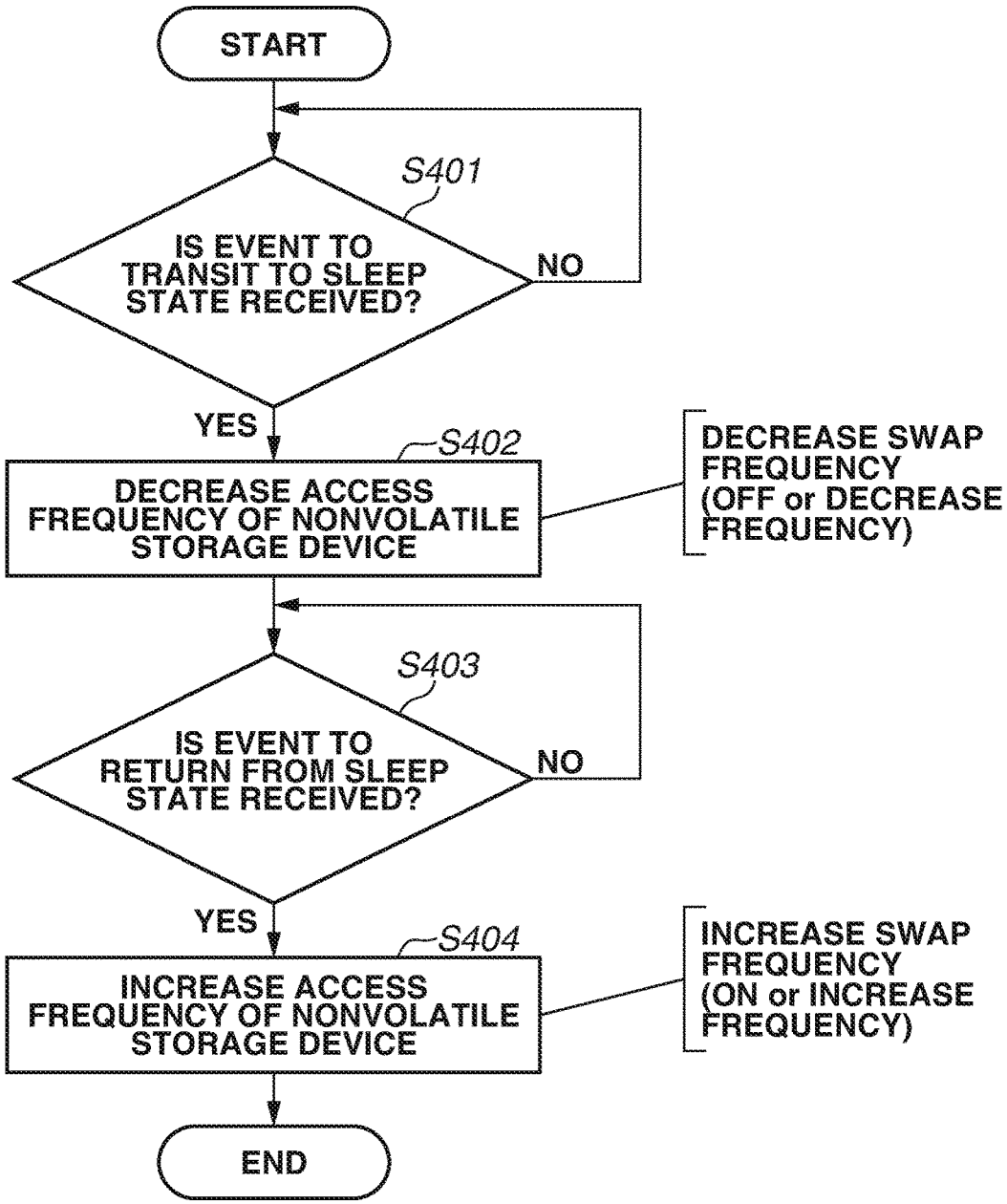
FIG. 4 illustrates an example of a flowchart for the controller according to an exemplary embodiment of the present disclosure.

FIG. 4 illustrates an example of a flowchart for the controller 103 according to an exemplary embodiment of the present disclosure. Referring to FIG. 4, the timer is set in response to a transition of the system to the standby state, and processing starts. Specifically, the CPU 340 receives an event to transit to the sleep state, for example, when a certain period of time has elapsed in a state where the user does not use the image forming apparatus 101 in the standby state, when the power saving key on the operation unit 105 is pressed, or when a set time has elapsed. In response to the reception of these events, the following processing starts.

In step S401, the CPU 340 causes the system power state to transit from the standby state to the sleep state. When the system power state transits to the sleep state, the CPU 340 notifies a storage destination switching unit 505 of the transition of the system power state. Further, the CPU 340 notifies the file system 502 of the transition of the system power state. In step S402, the file system 502 receives the notification from the storage destination switching unit 505, and performs one of process for reducing the swap frequency to the nonvolatile storage devices 106 and 503, and process for deactivating the swap to the nonvolatile storage devices 106 and 503. Note that a swap tendency includes a swap frequency.

Countermeasures to be taken vary depending on an operating system (OS). For example, in a Linux® OS, parameters are included in the /proc/sys/vm/swappiness file. The values of the parameters are 0 to 100, and a default value is, for example, 60. A swap is better performed with a larger value. When the value is 0, a swap is not performed until the capacity of the RAM is depleted. For example, the value of /proc/sys/vm/swappiness is directly overwritten as described below.

For example, when echo 10>/proc/sys/vm/swappiness is set, swappiness is set to 10. This value is applied until the system is shut down or the file is overwritten again.

The swap can be deactivated by a swapoff command.

For example, echo 1>/proc/sys/vm/swappiness is set to reduce the swap frequency.

The swap in this system will now be briefly described. A technique in which a real address area and a swap area, which are defined so as to correspond to physically different devices, are treated as continuous memory spaces is a virtual storage method. A virtual storage area is defined as a virtual storage device. For example, a memory (RAM), an HDD, and an SSD memory are treated as a real storage device. The real address area can be allocated to the real storage device by the system. An HDD and an SSD may be treated as an auxiliary storage device. The swap area can be allocated to the auxiliary storage device by the system.

The swappiness is decreased to thereby reduce the swap frequency from the real storage device to the auxiliary storage device. The swap area is allocated as a swap partition.

A swap is a process in which data with a low access frequency is saved in a storage device having a low reading/writing speed and a large capacity from a storage device having a high reading/writing speed and a small capacity, and the data is recovered when the data is accessed. The process will be described below with reference to FIG. 2. In the present exemplary embodiment, assume that all or a part of the HDD 106 and the flash disk 207 is set as the swap partition, i.e., the auxiliary storage device or the auxiliary storage area in a virtual storage system. The CPU 340 saves a page with a low access frequency in the storage device, such as the memory 341, into the swap partition of the storage device, such as the HDD 106 or the flash disk 207, via the disk controller 206. This process is referred to as swap-out or page-out. The swap partition is an example of the auxiliary storage area. On the other hand, when a page stored in the swap partition of the storage device, such as the HDD 106 or the flash disk 207, is accessed, the CPU 340 recovers the data to the storage device such as the memory 341 via the disk controller 206. This process is referred to as swap-in or page-in. An algorithm for selecting a page to be swapped is, for example, Least Recently Used (LRU), but the algorithm is not limited to this.

In the sleep state, when an event to return from the sleep state is received, for example, when a print job is received from the LAN 108 or when an event to press the power saving key on the operation unit 105 is received, the CPU 340 performs the following processing.

In step S403, the CPU 340 causes the system power state to transit from the sleep state to the standby state in which a display unit of the operation unit 105 is turned on, or to a job execution state in which the printer device 104 can be used in case of printing. In this case, the CPU 340 notifies the file system 502 of the transition of the system power state via the storage destination switching unit 505. In step S404, the file system 502 receives the notification from the storage destination switching unit 505 and performs one of process for increasing the swap frequency to the nonvolatile storage devices 106 and 503, and process for activating the swap to the nonvolatile storage devices 106 and 503.

Countermeasures to be taken vary depending on the OS. For example, in a Linux® OS, a swap partition or a swap file of an argument may be given to an mkswap command to create a swap file system, and the swap may be activated by a swapon command. For example, echo 60>/proc/sys/vm/swappiness may be set to increase the swap frequency. As a result, the swap frequency varies depending on the situation of the system. However, at least the swap tendency indicating that it is determined whether to cause a swap can be increased.

For example, consider a case where access to the HDD 106 in association with a swap, polling access from an application, or the like is made once within 75 seconds. If no countermeasures are taken, an application may access the memory at regular intervals. In this case, the OS irregularly causes a swap to increase an available memory. This results in an increase in an HDD access frequency. During an HDD operating time, a time (access time) in which a magnetic head of the HDD 106 is placed on a platter (magnetic disk) may exceed an HDD duty of 20% which is an indication of an HDD stable operation for a consumer. In this case, a probability that grease vaporized from a bearing due to rotation of the platter adheres to the magnetic head as foreign particles because of a pressure change between the magnetic head and the platter increases. As a result, a probability that a read and write operation on the HDD is failed may increase, and in addition, it may become difficult for the HDD 106 to physically operate. However, according to the present exemplary embodiment, since the number of swaps can be reduced when the system has entered the sleep state, the HDD access frequency can be reduced. The control can also be performed to reduce the set value of swappiness so as not to exceed the HDD duty of 20% which is an indication of a stable operation of the HDD 106 for a consumer. According to the present exemplary embodiment, a probability that grease vaporized from the bearing due to the rotation of the platter adheres to the magnetic head as foreign particles because of a pressure change between the magnetic head and the platter can also be reduced.

For another example, consider a case where write access to the SSD, which is an example of the flash disk 207, in association with a swap, polling access from an application, or the like is made once within 75 seconds. An upper limit of the number of times of writing data in the SSD is, for example, 10,000 times. When the upper limit is reached, writing of data into the SSD cannot be performed, which may make it difficult for the image forming apparatus 101 to provide services using the SSD. The present exemplary embodiment provides an advantageous effect that these problems can be eliminated or lessened.

A modified example of the description of the flowchart will be described below. The access to the nonvolatile storage devices 106 and 503 is not restricted to the time during transition to sleep. However, if the swap frequency remains low in a mode other than the sleep mode, the swap is not performed until the capacity of the memory is almost depleted. Accordingly, the capacity of the memory may be depleted and freeze may occur in the system for a short period of time. As a result, freeze may occur for a short period of time while the user is operating the UI in the standby state, or freeze may occur for a short period of time during a job, which may take a lot of time between paper discharges. This event may lead to a deterioration in a user's operation feeling. To deal with this issue, when the CPU 340 determines that the user is not present in front of the image forming apparatus 101, the access to the nonvolatile storage devices 106 and 503 may be restricted. The restriction of access indicates a reduction in swappiness. The case where it is determined that the user is not present in front of the image forming apparatus 101 may be a case where no human is detected by the human presence sensor that is mounted in the image forming apparatus 101. A period other than a period from a time when the user logs in the image forming apparatus 101 until a time when the user logs off can be considered as a condition. This condition is referred to as Condition 1.

Figure 6:
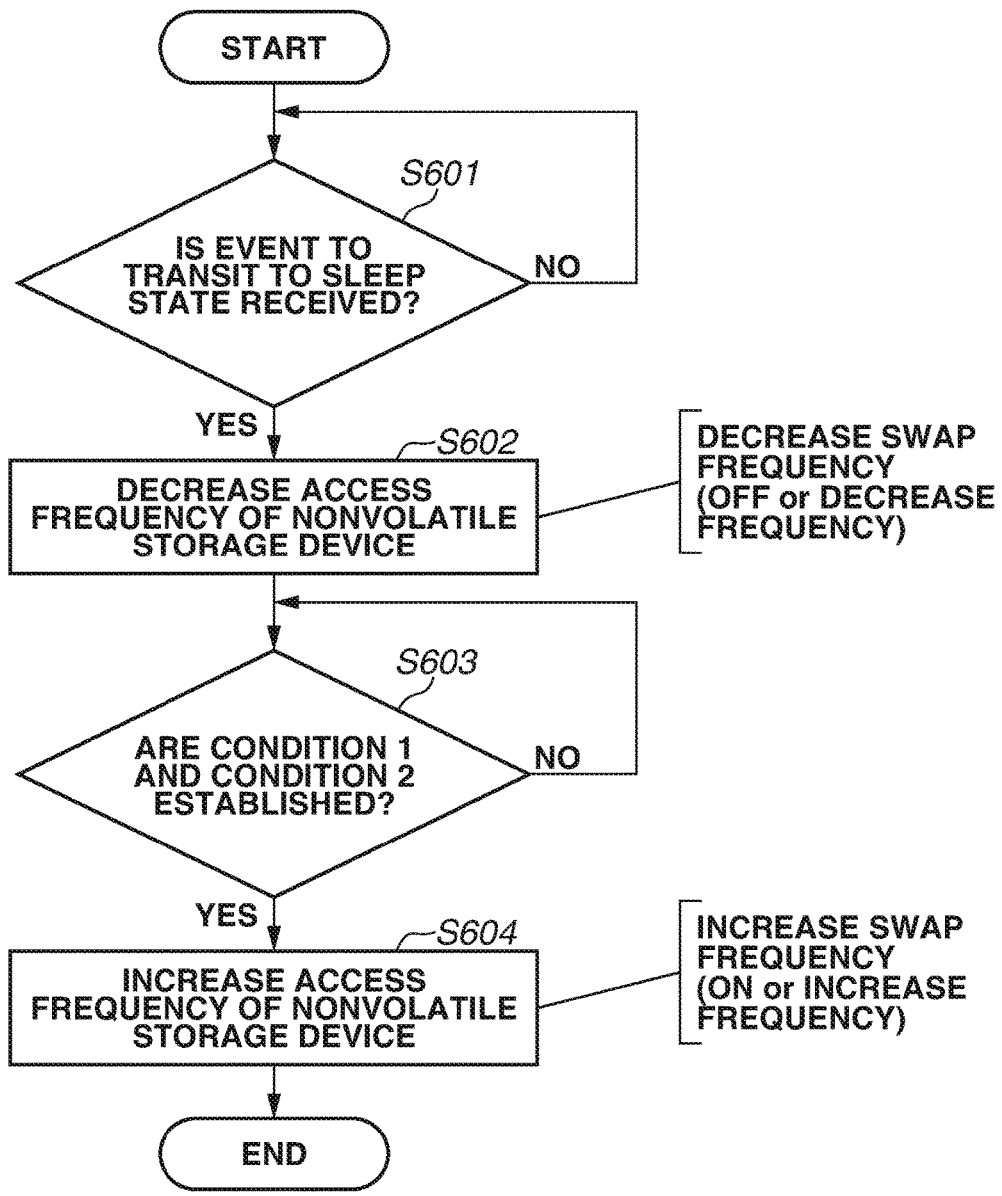
FIG. 6 is a flowchart illustrating a modified example of the flowchart for the controller according to an exemplary embodiment of the present disclosure.

Specifically, the relationship between the flowcharts of FIGS. 6 and 4 will be described below. FIG. 6 illustrates a flowchart in which the condition for step S403 in FIG. 4 is replaced by step S603. Specifically, in step S603, the above-described Condition 1 is added to the transition to the sleep state (see step S401; this configuration is hereinafter referred to as Condition 2).

Further, as a modified example of FIG. 6, only Condition 1 can be set as a condition in which the processing proceeds to step S604. That is, the modified example can be considered in which the processing proceeds to step S604 in a case where the determination result for Condition 1 is affirmative, without performing determination processing for Condition 2.

As described above, in a state other than the sleep state, such as a user operable state or a job executing state, in which the user uses the nonvolatile storage devices 106 and 503, the nonvolatile storage devices 106 and 503 may be accessed.

When the swap is turned off in the sleep state and the capacity of the memory is almost depleted, the OS may randomly terminate the process to stop the system. However, when the system is designed to manage peak usage of a physical memory so as not to deplete the capacity of the memory, swap off is effective to eliminate the access to the nonvolatile storage devices 106 and 503.

When the swap frequency is reduced in the sleep state, a swap occurs when the capacity of the memory is almost depleted for ensuring a large memory capacity for jobs or fragmentation, so that a job response speed is delayed and freeze occurs for a short period of time. However, since the user is not present in front of the image forming apparatus 101, a delay in the response speed may be negligible in many cases. HDD access is not generally made when the swap frequency is reduced, but the HDD access is made when the capacity of the memory is depleted.

The image forming apparatus 101 has been described above as an example of the information processing apparatus.

The HDD 106 and the flash disk 207 have been described above as examples of a nonvolatile storage unit in which the auxiliary storage area for saving data from the real storage area is defined.

Further, assume that the image forming apparatus 101 transits from a certain power state to a power state with lower power consumption than that in the power state. In response to this transition, the controller 103 may be controlled to reduce the frequency of saving data from the real storage area to the HDD 106 or the flash disk 207. In this case, the value in a swappiness file is decreased to thereby reduce the frequency from the swap frequency in a normal power state.

The image forming apparatus 101 can further include the human presence sensor 105.

The controller 103 can reduce the frequency of saving data from the real storage area to the flash disk 207 or the HDD 106 can be reduced to a predetermined frequency or less based on the detection result of the human presence sensor 105.

The power supply of the flash disk 207 or the HDD 106 in which the auxiliary storage area is set can be turned off to thereby restrict access (including zero times of access) to the auxiliary storage area.

Examples of the nonvolatile storage unit include a nonvolatile flash memory. A total writing volume on the flash memory within a predetermined time is set to be equal to or less than a predetermined value depending on the lifetime of the flash memory. Accordingly, the controller 103 restricts an access frequency to the flash memory.

Further, the controller 103 can restrict the access frequency to the HDD 106 in such a manner that a duty ratio for read and write processing on the HDD 106 becomes 20% or less.

Furthermore, the controller 103 can be controlled by Linux® which is an example of operating systems. The access frequency can be restricted based on a swappiness control instruction which is an example of commands for controlling the swap frequency that are issued to the Linux®.

The controller 103 can also perform the following operation when the power state transits from the first power state to the second power state with lower power consumption than the power consumption in the first power state. During the transition, in a case where the available memory capacity of each of the nonvolatile storage devices 106 and 503 is less than a certain threshold, the access frequency to each of the nonvolatile storage devices 106 and 503 can be reduced. In a case where the available memory capacity of each of the nonvolatile storage devices 106 and 503 is more than a certain threshold, each of the nonvolatile storage devices 106 and 503 can be turned off.

During the transition from the first power state to the second power state with lower power consumption than the power consumption in the first power state, the controller 103 reduces the access frequency to the swap partition of each of the nonvolatile storage devices 106 and 503, or turns off the swap partition of each of the nonvolatile storage devices 106 and 503.

The controller 103 can perform the following processing when the power state transits from the second power state to the first power state with higher power consumption than the power consumption in the second power state. The access frequency to the swap partition of each of the nonvolatile storage devices 106 and 503 can be increased, or the swap partition of each of the nonvolatile storage devices 106 and 503 can be turned on.

When the controller 103 determines that the user does not use the image forming apparatus 101, the access frequency to the nonvolatile storage devices 106 and 503 may be reduced, or the nonvolatile storage devices 106 and 503 may be turned off. Further, when the controller 103 determines that the user uses the image forming apparatus 101, the access frequency to the nonvolatile storage devices 106 and 503 may be increased, or the nonvolatile storage devices 106 and 503 may be turned on.

According to an aspect of the present exemplary embodiment, it is possible to mitigate the effects on the performance and physical functions of the nonvolatile storage device based on frequent access to the nonvolatile storage device.

According to another aspect of the exemplary embodiment of the present disclosure, it is possible to prevent deterioration of response to a user of the information processing apparatus in the case of mitigating the effects on the performance and physical functions of the nonvolatile storage device based on frequent access to the nonvolatile storage device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-010752, filed Jan. 24, 2017, which is hereby incorporated by reference herein in its entirety.

What is claimed is:

1. An information processing apparatus comprising:
   a volatile memory;
   a hard disk drive including an auxiliary storage area defined therein to save data saved from the memory; and
   a controller including the memory storing instructions and a processor which executes the instructions, the controller being configured to: reduce a frequency of access to the hard disc drive to save the data from the memory to the auxiliary storage area in a second power state more than a frequency of access to the hard disc drive to save the data from the memory to the auxiliary storage area in a first power state so that a duty ratio of the hard disc drive is 20% or less when the information processing apparatus shifts from the first power state to the second power state in which power consumption is lower than in the first power state.

2. The information processing apparatus according to claim 1, wherein the controller turns off a power supply of the hard disk drive to restrict access to the auxiliary storage area.

3. The information processing apparatus according to claim 1, wherein the controller is controlled by an operating system and restricts an access frequency based on a command related to a swap instructed to the operating system.

4. The information processing apparatus according to claim 1, further comprising:
   a human presence sensor unit,
   wherein the information processing apparatus shifts from the first power state to the second power state based on a detection result of the human presence sensor unit.

5. The information processing apparatus according to claim 1, wherein the frequency of access is determined based on a value of a parameter for specifying easiness of saving data from the memory to the auxiliary storage area.

6. A control method to be executed by an information processing apparatus including a volatile memory, a hard disk drive including an auxiliary storage area defined therein to save data saved from the memory, and a controller including memory storing instructions and a processor which executes the instructions, the controller being configured to:
   reduce a frequency of access to the hard disc drive to save the data from the memory to the auxiliary storage area in a second power state more than a frequency of access to the hard disc drive to save the data from the memory to the auxiliary storage area in a first power state, so that a duty ratio of the hard disc drive is 20% or less when the information processing apparatus shifts from the first power state to the second power state in which power consumption is lower than in the first power state.

* * * * *